United States Patent
Janardhanan et al.

(10) Patent No.: US 10,608,834 B2
(45) Date of Patent: Mar. 31, 2020

(54) APPROACH AND SYSTEM FOR AVOIDING AMBIGUOUS ACTION VIA MOBILE APPS THROUGH CONTEXT BASED NOTIFICATION

(71) Applicant: Honeywell International Inc., Morris Plains, NJ (US)

(72) Inventors: Shaiju Janardhanan, Kannur (IN); Hemanth Padikkal Veettil, Parappanangadi (IN); Nikhil Scaria, Kannur (IN)

(73) Assignee: Honeywell International Inc., Morris Plains, NJ (US)

( * ) Notice: Subject to any disclaimer, the term of this patent is extended or adjusted under 35 U.S.C. 154(b) by 477 days.

(21) Appl. No.: 15/227,648

(22) Filed: Aug. 3, 2016

(65) Prior Publication Data
US 2018/0041356 A1 Feb. 8, 2018

(51) Int. Cl.
| | | |
|---|---|---|
| *H04M 3/00* | (2006.01) | |
| *H04L 12/28* | (2006.01) | |
| *H04W 4/20* | (2018.01) | |
| *H04W 68/00* | (2009.01) | |

(52) U.S. Cl.
CPC ...... *H04L 12/2818* (2013.01); *H04L 12/2821* (2013.01); *H04W 4/20* (2013.01); *H04W 68/005* (2013.01)

(58) Field of Classification Search
CPC ......... H04M 1/72522; H04M 1/72525; H04W 24/02; H04W 12/08
See application file for complete search history.

(56) References Cited

U.S. PATENT DOCUMENTS

| | | | | |
|---|---|---|---|---|
| 7,828,661 B1* | 11/2010 | Fish | ................ | A63F 13/87 463/42 |
| 7,917,232 B2* | 3/2011 | McCoy | ................ | H04L 41/22 700/17 |
| 9,154,606 B2 | 10/2015 | Tseng et al. | | |

(Continued)

FOREIGN PATENT DOCUMENTS

| | | |
|---|---|---|
| EP | 2998946 A1 | 3/2016 |
| WO | 2015089116 A1 | 6/2015 |

OTHER PUBLICATIONS

The Extended European Search Report for EP Application No. 17184456.6, dated Nov. 13, 2017.

*Primary Examiner* — Shantell L Heiber
(74) *Attorney, Agent, or Firm* — Seager, Tufte & Wickhem LLP (57) ABSTRACT

A mechanism, with action awareness, incorporating a building automation system (BAS) having an interface screen. A mobile device may be logged by a first user into an app for connecting with the interface screen. A display of the mobile device may show the interface screen that reveals one or more components in a space covered by the BAS. The first user may select a first component of the one or more components in the display and perform a first action on the component. A second user may log into an app with a second or the same mobile device which has a display that reveals the one or more components in the space. The second user may select the first component in the display and see a notification describing one or more actions already performed on the first component before deciding whether to perform an action on it.

7 Claims, 5 Drawing Sheets

(56) References Cited

U.S. PATENT DOCUMENTS

| | | | |
|---|---|---|---|
| 9,632,671 B2* | 4/2017 | Albright | G06F 3/04842 |
| 2013/0052946 A1 | 2/2013 | Chatterjee et al. | |
| 2013/0054033 A1* | 2/2013 | Casilli | H04L 12/282 |
| | | | 700/276 |
| 2014/0288714 A1* | 9/2014 | Poivet | G05B 15/02 |
| | | | 700/275 |
| 2015/0220073 A1 | 8/2015 | Lyman et al. | |
| 2016/0110833 A1* | 4/2016 | Fix | G06Q 50/265 |
| | | | 705/324 |

* cited by examiner

APPROACH AND SYSTEM FOR AVOIDING AMBIGUOUS ACTION VIA MOBILE APPS THROUGH CONTEXT BASED NOTIFICATION

BACKGROUND

The present disclosure pertains to mobile devices and apps for interacting with remote components.

SUMMARY

The disclosure reveals a mechanism, with action awareness for a system, incorporating a building automation system (BAS) having an interface screen. A mobile device may be logged by a first user into an application (app) for connecting with the interface screen. A display of the mobile device may show the interface screen that reveals one or more components in a space covered by the BAS. The first user may select a first component of the one or more components in the display and perform a first action on the component. A second user may log into an app with a second or the same mobile device which has a display that reveals the one or more components in the space. The second user may select the first component in the display of the second mobile device and see a notification describing one or more actions already performed on the first component before deciding whether to perform an action on it.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

A mobile application (app) may be used for interacting with security and home automation systems. These systems, which can be regarded as a building automation system, may be installed, for example, at premises that are used by residents of the premises via different logins or credentials. Each user logged into the app may have access to the respective building automation device screen. Within the automation device screen, a user may navigate to a particular device screen by clicking on the automation device screen, and performing the desired action on the device using the app. Since the app may be shared with one or more users, a chance of overlapping user actions is plausible.

An action performed on a particular device by one user accessing the app may get reversed or modified by another action performed on the same device independently by another user accessing the app. Such a situation may cause user confusion and distrust in the system as actions or commands triggered by one user from a different location in the home or building, or remotely, may appear as an unexpected event to the other people using the same app. The issues mentioned herein may be overcome if there is a way to notify or inform the user about recent actions performed on any of the devices.

A present approach may have a solution where live notifications that are displayed to the user based on the context of a device being operated on, as well as a recent activity list on the device home page. The notifications may keep the user informed about the type and time of a particular action performed on a device along with the details of who performed the action. When a user accesses the device page he or she may be provided with a drop-down notification which states how many actions were performed recently on the device. The user may choose to ignore the drop-down notification and proceed with his or her activity.

The issues mentioned may be overcome if there is a way to notify the user about recent actions performed on any of the devices. The present approach may have a solution where live notifications are displayed to the user based on the context of the device being operated on as well as a recent activity list on the device home page. The notifications may keep the user informed about the type and time of a particular action performed on a device along with the details of who performed the action.

Once the user clicks on a particular device of the device page, a device context page may be loaded. The page may display a notification about recent activities performed on the particular device.

Mobile apps may be an integral part of any building automation system. The apps may make the building automation system convenient, available and easy to use for a customer. The app may keep the customer informed about different parameters of the system via alerts or notifications. It may be a one stop tool to manage the customer premise remotely or locally. An app for a building automation system may provide an interface to interact with the different components in the system while providing alerts or notifications regarding the same. The app may identify each user based on the credentials entered into it. The credentials may be a username, a password combination or a secret code mapped against a particular user. Each action performed by any of the users may be recorded and maintained in the panel logs.

The security functions supported by the app may include, but not be limited to, activating or deactivating the system, bypassing specific areas in a home or other building, and so on. The building automation functions supported by the app may include, but not be limited to, turning on or off different devices, calibrating the devices, creating schedules, and so forth.

The app may provide a well-defined visual interface listing various and different building automation devices, and actions to be performed on those devices. Each device may be selected to open the particular device's context page that allows different actions to be performed on the same device. A user logged into the app using his or her credentials may perform actions on the device independently and irrespective of whether other users are logged into the app or not.

An issue may be noted. The mobile app for interacting with a building automation system installed at a premise may be used by the residents of these premises via different logins. Each user logged into the app may have access to the building automation device screen. Within the building automation device screen, a user may navigate to a particular device screen by clicking on it and perform the desired action on the device using the app. Since the app may be shared, chances of overlapping user actions are plausible. An action performed on a particular device by one user accessing the app may get reversed or modified by another action performed by some other user on the same device independently by another user accessing the app. Such a situation may cause user confusion and distrust in the system as actions or commands triggered by one user from a different location in the home or other building, or remotely, may appear as an unexpected event to the other people using the same app.

Figure 1:
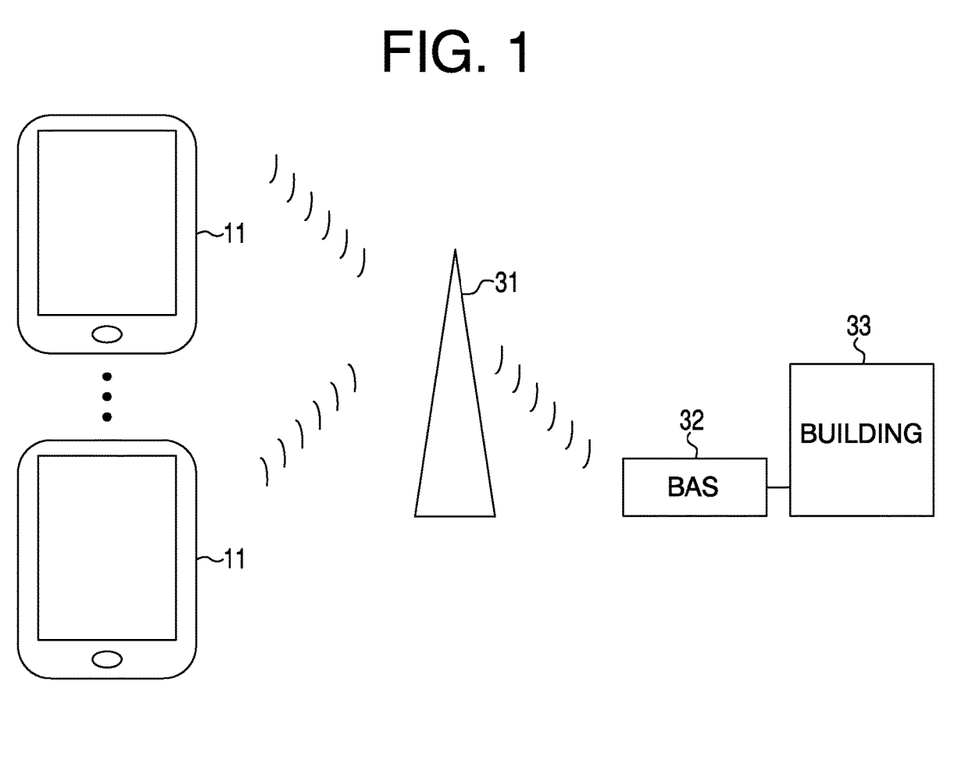
FIG. 1 is a diagram of an example layout of items for the present system.

FIG. 1 is a diagram of an example layout of components for the present system. One or more mobile devices 11 with a present app may be logged into an interface of a building automation system (BAS) 32 via a medium and tower 31. Other media may be utilized between mobile devices 11 and BAS 32. Building automation system 32 may be connected to various components in a building 33. The components may be controlled with a mobile device with the app noted herein.

Figure 2:
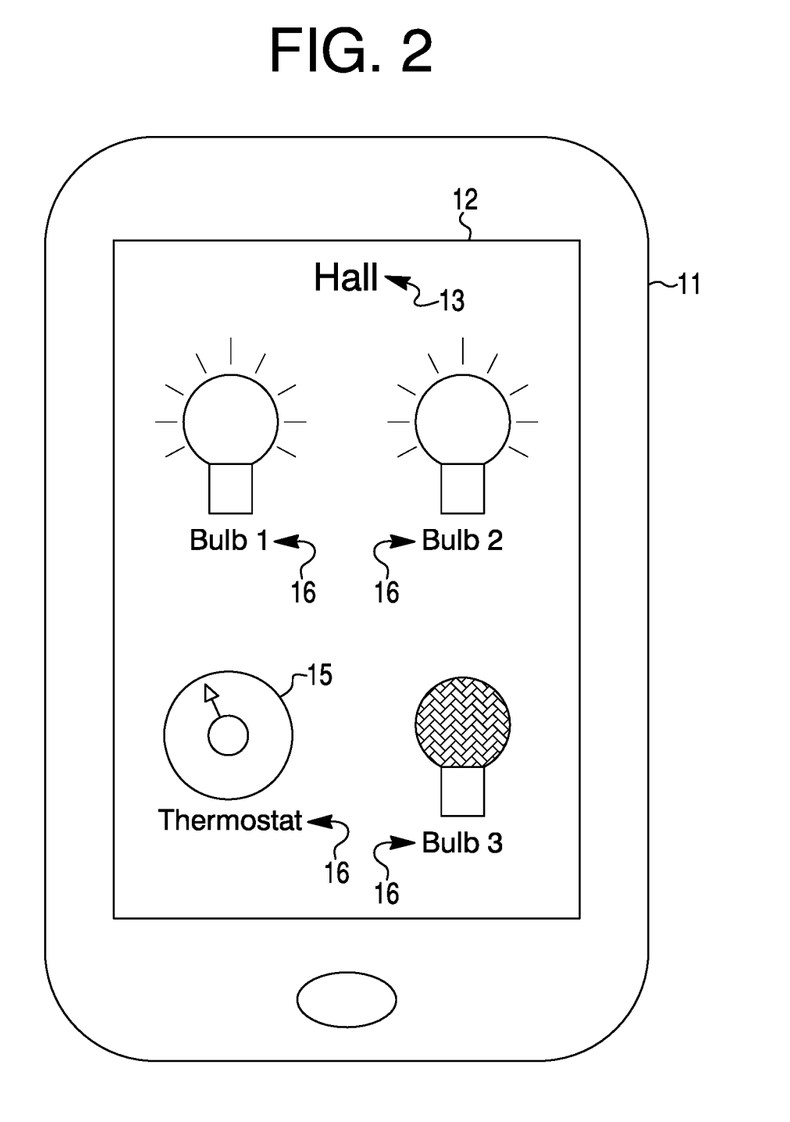
FIG. 2 is a diagram of a screen showing an app mobile device page of a room.

An app mobile device 11 page 12 of a room may be in a diagram of FIG. 2. Premise or room details 13, such as a hall, may be indicated. A device may have a label 16 and its status represented via visual effects. For demonstration purposes, one may consider a light bulb as an example. However, instead of a bulb or bulbs, any other instrument or instruments, such as some electronics like a processor, a thermostat, and/or so forth, may be in place of the bulb or bulbs. Other actions, besides switching a device on or off, such as calibration, changing mode of operation, changing connections, and/or so forth, may be performed on a device. Further, there may be more or less than four devices on page 12. Here, bulbs 1 and 2 may be shown as turned on and bulb 3 may be revealed as turned off. For instance, a thermostat 15 or other kind of device may be in the hall and shown with an icon on page 12 of device 11. The present approach may be applicable to virtually any building automation device, and/or other kind of device or devices.

Figure 3:
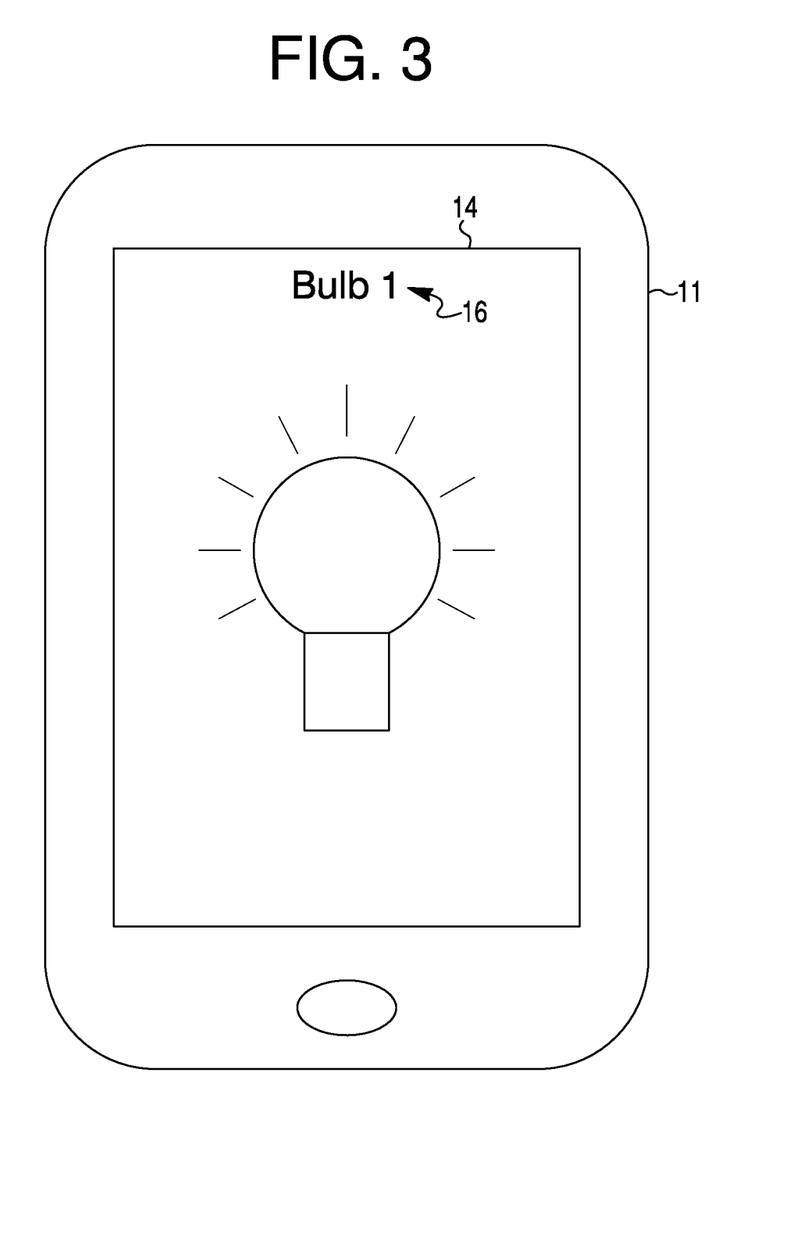
FIG. 3 is a diagram of a particular device page on the screen of a mobile device.

A device context page 14 may be noted. To perform an action on any particular device, the user may click on bulb 1 in the main device page 12, which can bring up a particular device's context page 14 for bulb 1, as shown in FIG. 3. Here, the user may click on bulb 1 to turn it "on" or "off".

One scenario may involve two users with conflicting requirements operating on the same device. The two users may have different requirements with respect to a device. For instance, a first user may want bulb 1 to be turned on whereas a second user may want bulb 1 to be turned off. The first user may go to device page 14 and turn on bulb 1. After some time, the second user may see bulb 1 on and turn it off. This situation may cause a confusion in the first user about how bulb 1 suddenly got turned off. The situation may be repeated and could result in a disagreement between the first user and the second user.

Another scenario may involve two users accessing the same device page with similar requirements. Two users may have similar requirements with respect to a device. A first user and second user may want bulb 1 to be turned on. The first user may go to the device page and turn on bulb 1. In the meanwhile, the second user may be in the process of turning bulb 1 on, and he or she may suddenly find the status of the device changing on the device context page as a consequence of the first user's action. This may result in confusion for the second user, or the second user may think the app is ill-functioning.

On still another scenario, a user may have set a schedule for activating a device. A first user may have set a schedule for turning on bulb 1 at a particular time. When the schedule is executed, then bulb 1 may turn on. The second user who is unaware of the schedule may be surprised seeing the light turning on and in some cases the second user may even turn it off.

The issues discussed herein may be overcome if there is a way to notify a user about recent actions performed on any of the devices, particularly by other users. The present approach may be a solution where live notifications are displayed to the user based on the context of the device being operated on as well as an activity list on the device home page. The notification may keep the latter user informed about the type and time of a particular action performed on a device along with the details of one or more previous users who performed the actions. When the user accesses the device page, he or she may be provided with a drop-down notification which states how many actions were recently performed on the particular device or devices. The user may choose to ignore the drop-down notification and proceed with his or her activity. Once the user clicks on a particular device, the device context page may be loaded.

The recent activity information about a device may help the user make an informed decision about the activity he or she needs to perform. If the user wants to check the details of how a particular device setting was changed, he or she no longer needs to access the log information of the app. Instead, the user may navigate to the device context page and see the recent changes.

The present approach may avoid ambiguity while using the app to perform actions on devices. The approach may enable a user to make informed decisions before performing an action on the devices. Conflicts between users may be avoided by keeping all users of the app aware of the actions being performed. Reliability on the app as well as the devices may increase by keeping users informed via the live notifications. The present solution may be easily integrated into existing apps.

A solution visualization on a device context page may be noted. A first user may turn on bulb 1. A second user may see a notification of the first user's action in the device context page.

Figure 4A:
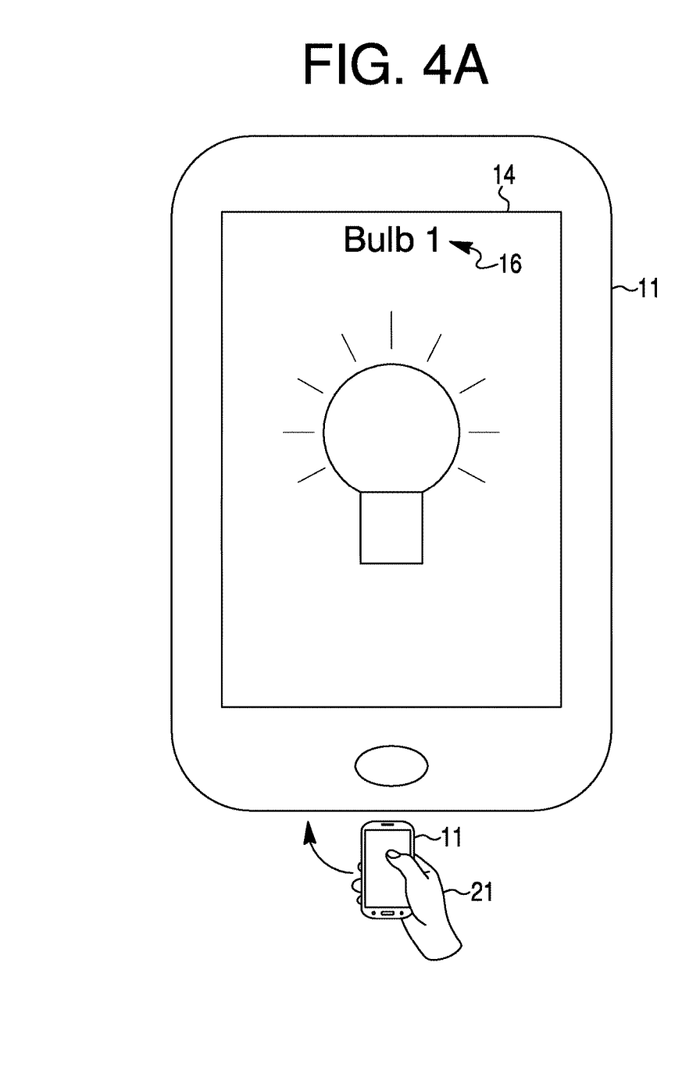
FIG. 4a is a diagram of the particular device page showing a bulb of the mobile device that may be turned on or off with a click on the bulb in the screen.
Figure 4B:
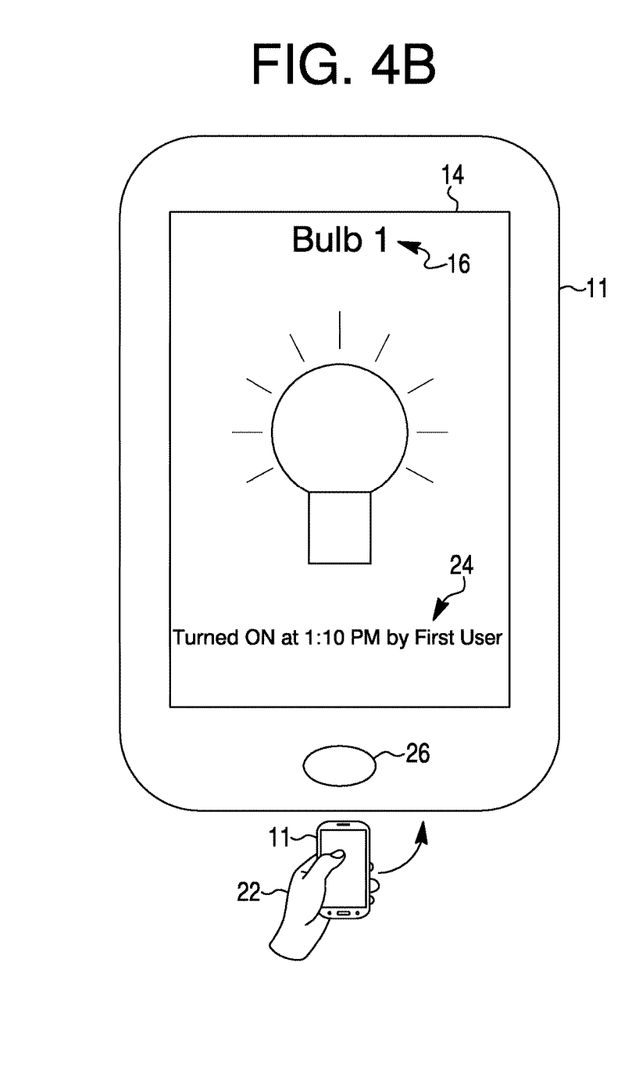
FIG. 4b is a diagram of the same particular device page on the screen of FIG. 4a with an addition of a message revealing an action on the bulb by a previous user at an indicated time.
Figure 5:
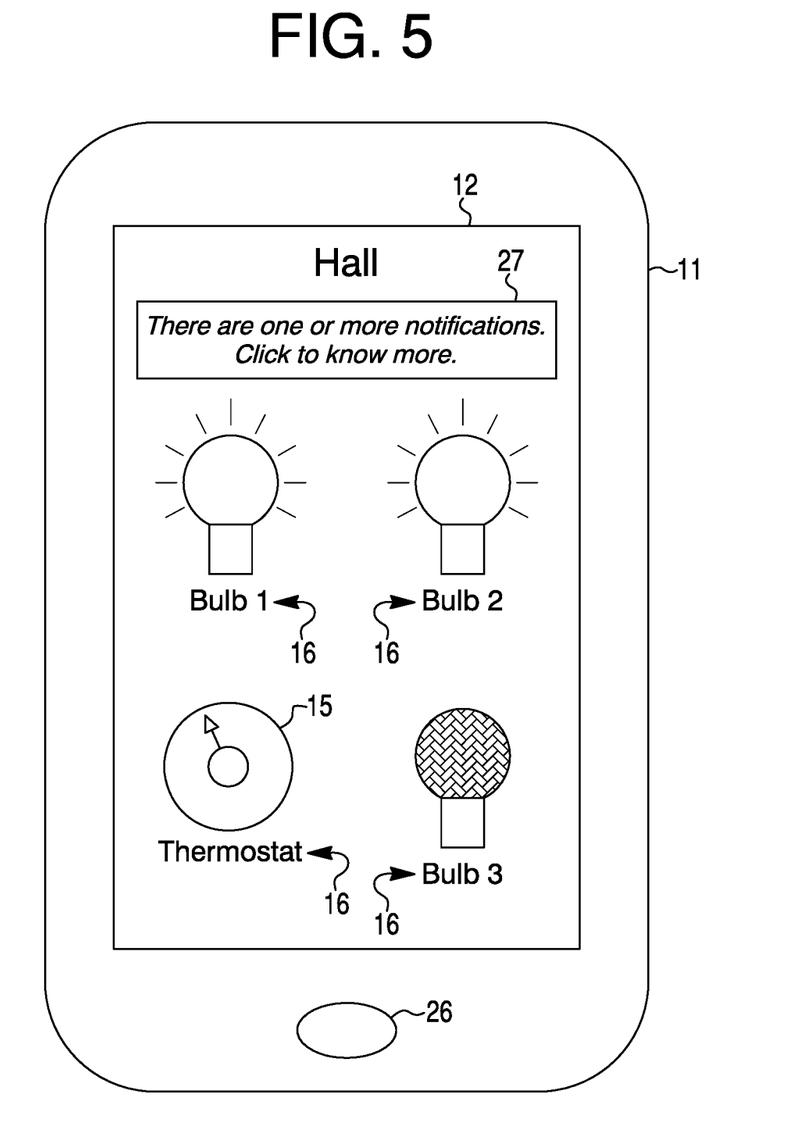
FIG. 5 is a diagram of the screen in FIG. 2 with an addition of one or more messages revealing that there are one or more available notifications and a way to retrieve them.

FIG. 4a is a diagram of a mobile device 11 showing a particular device page of bulb 1. Bulb 1 may be turned on by a first user 21. A second user 22 may want to perform an action on the same device, such as bulb 1, with a different mobile device or the same device 11, as illustrated in a diagram of FIG. 4b. A drop-down notification, a context page, or message 24 may appear on particular device page of mobile device 11. An example message may be "Turned ON at 1:10 PM by First User". One may press a button 26 to return back to page 12 of mobile device 11, as indicated by a diagram in FIG. 5. A message on page 12 may state, "There are one or more notifications. Click to know more." Other notifications or actions may be observed by second user 22. Even an identity of first user 21 may be determined from login credentials. With this and other information, second user 22 may be able to make an informed decision relative to bulb 1. The decision may be an action or not. First user 21 may check a history of bulb 1 to recall what actions were taken by first user 21, or other user. Other kinds of devices may be shown on page 12 for a particular hall or portion of a premise of one of the users or someone else.

To recap, a mechanism with action awareness for a system, may incorporate a building automation system having an interface screen, and a mobile device logged by a first user into an app for connecting with the interface screen of the building automation system. A display of the mobile device may show the interface screen of the building automation system. The display may reveal one or more components in a space covered by the interface screen of the building automation system. The first user may select a first component of the one or more components in the display and perform a first action on the component. A second user may log into an app with a second mobile device that has a display that reveals one or more components in a space covered by the interface screen of the building automation system. The second user may select the first component of the one or more components in the display of the second mobile device and see a notification pertaining to the first component about one or more actions performed on the component.

The second user may decide in view of the notification whether to perform an action on the first component.

The notification may indicate a type and time of a previous action performed on the device, details about who performed the action, and how many actions were performed on the device.

The app may identify each user based on unique credentials used to log into the app of the building automation system.

Other users may log into the app to get the first component on the displays of their mobile devices, respectively, and perform an action on the component in the display.

Each action performed by any user may be recorded and stored.

An action on a component may be selected from a group of actions incorporating turning on or off the component, calibrating the component, creating a schedule for the component, obtaining parameter values from the component, and adjusting parameters of the component.

An approach of reconciling ambiguous actions with a mobile device via an app to a system, may incorporate using a mobile device via an app to obtain an interface of a building automation system on a display of the mobile device, clicking on one or more components of the building automation system shown in the interface on the display to see a list of actions that can be applied to the selected component, clicking on the selected component that results in a context page of the component being downloaded, which displays a drop-down notification that shows actions that have been performed on the selected component, and deciding whether to perform an action on the selected component in view of the drop-down notification.

The drop-down notification may indicate a type and time of each action and details of who performed the action.

Two or more users of a mobile device with the app may perform an action on the same selected component.

Two or more users of a mobile device with the app may perform the same action on the same selected component.

A user may be informed about different parameters of components of the building automation system on the context page in a form of alerts and notifications.

Security matters of various premises covered by the building automation system may be provided in a form of drop-down alerts and notifications.

One or more actions may be selected from a group incorporating activating a component, deactivating a component, calibrating a component, creating a schedule for a component, and selecting or bypassing specific areas or premises covered by the building automation system.

An apparatus for performing non-ambiguous actions in a building automation system, may incorporate a building automation system, and a mobile device having a display, connectable to the building automation system. A user may log with the mobile device into an app that obtains an interface screen from the building automation system. The user logged into the app may perform actions on a device of the building automation system via the interface screen on the display even though one or more other users can log into the app to perform actions on the device via the interface screen. When a user accesses the device page of the interface screen as shown on the display, and clicks on a device, a drop-down notification may appear that indicates a type and time of a previous action performed on the device, details about who performed the action, and how many actions were performed on the device.

A user may obtain the type and time of a previous action performed on the device, details about who performed the action, and how many actions were performed on the devices, without accessing log information of the app.

In a situation of overlapping actions of users, an action performed on a particular device by a user of the app may be reversed or modified by another user accessing the app.

Each user of the app may be identified by credentials entered upon logging into the app by the user registering to use the app.

An action that is performed on a device may be selected from a group of actions incorporating activating and deactivating devices, turning on and off devices, calibrating devices, creating schedules for devices, and centering on specific areas covered by the building automation system.

The user may navigate in the interface screen to and click on a device to perform an action on the device.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism with action awareness for a system, comprising:
a building automation system having an interface screen; and a first mobile device logged by a first user into an app for connecting with the interface screen of the building automation system; and wherein:

a display of the first mobile device shows the interface screen of the building automation system;

the display reveals one or more components in a space covered by the interface screen of the building automation system;

the first user selects a first component of the one or more components in the display and performs a first action on the component;

a second user logs into an app with a second mobile device that has a display that reveals the one or more components in a space covered by the interface screen of the building automation system;

the second user selects the first component of the one or more components in the display of the second mobile device and sees a notification identifying the first action performed by the first user on the component and that the first action was performed by the first user on the component; and the app on the first mobile device and the app on the second mobile device are configured to connect with the interface screen of the building automation system in a same building as the building automation system and a location different from the building automation system.

2. The mechanism of claim 1, wherein the second user can decide in view of the notification whether to perform an action on the first component.

3. The mechanism of claim 1, wherein the notification indicates a type and time of a previous action performed on the first component, details about who performed the action, and how many actions were performed on the first component.

4. The mechanism of claim 1, wherein the app identifies each user based on unique credentials used to log into the app of the building automation system.

5. The mechanism of claim 1, wherein other users can log into the app to get the first component on the displays of their mobile devices, respectively, and perform an action on the component in the display.

6. The mechanism of claim 5, wherein each action performed by any user is recorded and stored.

7. The mechanism of claim 1, wherein an action on a component can be selected from a group of actions comprising turning on or off the component, calibrating the component, creating a schedule for the component, obtaining parameter values from the component, and adjusting parameters of the component.

\* \* \* \* \*